(12) United States Patent
Kirimoto

(10) Patent No.: US 10,543,872 B2
(45) Date of Patent: Jan. 28, 2020

(54) VEHICLE FRONT STRUCTURE

(71) Applicant: Toyota Jidosha Kabushiki Kaisha, Toyota-shi, Aichi-ken (JP)

(72) Inventor: Takayuki Kirimoto, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 169 days.

(21) Appl. No.: 15/939,873

(22) Filed: Mar. 29, 2018

(65) Prior Publication Data
US 2018/0290688 A1 Oct. 11, 2018

(30) Foreign Application Priority Data
Apr. 5, 2017 (JP) .................. 2017-075392

(51) Int. Cl.
| | | |
|---|---|---|
| *B62D 21/15* | (2006.01) | |
| *B60L 3/00* | (2019.01) | |
| *B60L 50/71* | (2019.01) | |
| *B62D 25/08* | (2006.01) | |
| *F16F 7/12* | (2006.01) | |

(52) U.S. Cl.
CPC .......... *B62D 21/152* (2013.01); *B60L 3/0007* (2013.01); *B60L 50/71* (2019.02); *B62D 25/082* (2013.01); *F16F 7/12* (2013.01)

(58) Field of Classification Search
CPC ..... B62D 21/152; B62D 25/082; B60L 50/71; B60L 3/0007; F16F 7/12; B60K 2001/0411; B60K 1/04; B60K 1/00
See application file for complete search history.

(56) References Cited

U.S. PATENT DOCUMENTS

| | | | | |
|---|---|---|---|---|
| 2003/0108784 A1* | 6/2003 | Enjoji | .................... | H01M 8/02 429/434 |
| 2008/0149410 A1* | 6/2008 | Yang | ....................... | B60K 1/04 180/291 |
| 2008/0283316 A1* | 11/2008 | Ono | ..................... | B60K 15/063 180/68.5 |
| 2013/0119758 A1* | 5/2013 | Takamatsu | ............... | B60K 1/00 307/9.1 |
| 2014/0097641 A1* | 4/2014 | Hayano | ................. | B60L 15/007 296/187.09 |
| 2014/0110185 A1 | 4/2014 | Naito et al. | | |
| 2014/0117198 A1* | 5/2014 | Shimada | ................... | B60K 1/00 248/560 |
| 2014/0151138 A1* | 6/2014 | Kitami | ..................... | B60L 3/04 180/65.21 |

(Continued)

FOREIGN PATENT DOCUMENTS

JP 2014083875 A 5/2014

*Primary Examiner* — Drew J Brown
(74) *Attorney, Agent, or Firm* — Dinsmore & Shohl LLP

(57) ABSTRACT

A vehicle front structure includes a pair of front side members, the front side members being respectively placed on the right side and on the left side in a vehicle width direction in a vehicle front space ahead of a vehicle cabin space in a vehicle, so as to extend in a vehicle front-rear direction. A fuel cell unit is placed in a region sectioned by the front side members in the vehicle front space. A high-voltage component is placed above the front side members, and an inner edge portion of the high-voltage component in the vehicle width direction is placed outwardly in the vehicle width direction from an inner edge portion of the front side member in the vehicle width direction.

7 Claims, 9 Drawing Sheets

(56) References Cited

U.S. PATENT DOCUMENTS

| | | | | |
|---|---|---|---|---|
| 2014/0345960 A1* | 11/2014 | Yamanaka | ............... | H05K 5/03 |
| | | | | 180/65.8 |
| 2015/0021114 A1* | 1/2015 | Hotta | ...................... | B60K 1/00 |
| | | | | 180/279 |
| 2015/0107920 A1* | 4/2015 | Sakamoto | ................ | B60K 1/00 |
| | | | | 180/65.31 |
| 2017/0015199 A1* | 1/2017 | Shiba | .................... | B60L 3/0007 |
| 2017/0291643 A1* | 10/2017 | Sakamoto | .............. | B60K 11/04 |
| 2017/0297513 A1* | 10/2017 | Katano | ............... | B60R 16/0207 |
| 2018/0229771 A1* | 8/2018 | Sekine | ..................... | B60K 1/00 |
| 2018/0342718 A1* | 11/2018 | Iacovoni | ................. | B60K 1/04 |
| 2019/0047393 A1* | 2/2019 | Kato | ....................... | B60L 50/64 |

* cited by examiner

VEHICLE FRONT STRUCTURE

CROSS-REFERENCE TO RELATED APPLICATIONS

This application claims priority to Japanese Patent Application No. 2017-075392 filed on Apr. 5, 2017, which is incorporated herein by reference in its entirety including the specification, drawings and abstract.

BACKGROUND

1. Technical Field

This disclosure relates to a vehicle front structure.

2. Description of Related Art

A vehicle provided with an engine is often configured such that the engine is placed in a vehicle front portion ahead of a vehicle cabin across a dash panel, and a space ahead of the dash panel is often called an engine compartment. A vehicle equipped with an eco-friendly fuel cell that does not use fossil fuel does not use an engine. In view of this, it is conceivable that a fuel cell unit and a high-voltage component such as an inverter are placed in a space that is conventionally used as an engine compartment.

For example, Japanese Unexamined Patent Application Publication No. 2014-83875 (JP 2014-83875 A)) describes a protection structure at the time when a collision load is input into a power plant provided in a vehicle front portion. The power plant is configured such that a high-voltage component including a converter, a hydrogen supply device such as a hydrogen pump, and a driving motor are placed around a fuel cell unit. The power plant is surrounded on every side by collision managing members such as a dash panel and a front side member and is placed at intervals from the collision managing members. Hereby, when a collision load is input, the power plant is displaced within the intervals.

SUMMARY

Since the fuel cell unit and the high-voltage component handle a high voltage, it is necessary to prevent them from being damaged by interference between the fuel cell unit and the high-voltage component at the time when the vehicle receives an impact load. Due to a restriction to a mounting space in a vehicle front structure, and the like, an element that handles a high voltage may be placed inwardly in a vehicle width direction from a member having a sufficient rigidity with respect to the impact load. In this case, it is necessary to prevent interference between the element placed inwardly in the vehicle width direction and other elements so as to protect them from the impact load. In the related art, e.g., JP 2014-83875 A, the high-voltage components and the like are placed around the fuel cell unit. Accordingly, when the vehicle receives an impact load due to a collision or the like, a strong interference might occur between the elements handling a high voltage. When a strong interference occurs between the elements upon receipt of the impact load, an element with a lower impact resistance might be damaged in some cases. In view of this, in terms of a vehicle front structure in which a fuel cell unit and a high-voltage component are placed, it is demanded to restrain interference between the fuel cell unit and the high-voltage component at the time when a vehicle receives an impact load due to a collision or the like.

A vehicle front structure according to this disclosure includes a pair of front side members, a fuel cell unit, and a high-voltage component. The front side members are respectively placed on a right side and on a left side in a vehicle width direction in a vehicle front space ahead of a vehicle cabin space in a vehicle, so as to extend in a vehicle front-rear direction. The fuel cell unit is placed in a region sectioned by the front side members in the vehicle front space. The high-voltage component is placed above a corresponding one of the front side members. In a top view, an inner edge portion of the high-voltage component in the vehicle width direction is placed outwardly in the vehicle width direction from an inner edge portion of the corresponding one of the front side members in the vehicle width direction.

The front side members in the vehicle front structure are members constituting a body and have rigidity effective at the time when the vehicle receives an impact load due to a collision or the like. In the above configuration, the high-voltage component is placed outwardly in the vehicle width direction from the inner edge portion of the front side member in the vehicle width direction. Accordingly, even if the fuel cell unit moves outwardly in the vehicle width direction at the time when the vehicle receives an impact load due to a collision or the like, the high-voltage component is protected due to the rigidity of the front side member.

The vehicle front structure according to this disclosure may further include a dash panel and a suspension tower. The dash panel may separate the vehicle cabin space from the vehicle front space in the vehicle. The suspension tower may be coupled with the corresponding one of the front side members in the vehicle front space, so as to extend upward in a vehicle up-down direction. The fuel cell unit may be placed in a region sectioned by the dash panel and the front side members in the vehicle front space. The high-voltage component may be placed above the corresponding one of the front side members in a region between the dash panel and the suspension tower.

The dash panel and the suspension tower are members constituting the body, and have rigidity effective at the time when the vehicle receives an impact load due to a collision or the like. In the above configuration, the high-voltage component is surrounded by the front side member, the dash panel, and the suspension tower, and thus, the rigidity thereof can restrain interference between the fuel cell unit and the high-voltage component.

The vehicle front structure according to this disclosure may include an impact absorber provided between the fuel cell unit and the high-voltage component, the impact absorber being attached to an inner side surface of the corresponding one of the front side members in the vehicle width direction.

In the above configuration, even if the fuel cell unit moves outwardly in the vehicle width direction at the time when the vehicle receives an impact load due to a collision or the like, the impact absorber receives the fuel cell unit, thereby making it possible to sufficiently retrain the interference between the fuel cell unit and the high-voltage component.

A vehicle front structure according to this disclosure includes a dash panel, a pair of front side members, a fuel cell unit, a high-voltage component, and an impact absorber. The dash panel separates a vehicle cabin space from a vehicle front space in a vehicle. The front side members are respectively placed on a right side and on a left side in a vehicle width direction in the vehicle front space, so as to extend in a vehicle front-rear direction. The fuel cell unit is placed in a region sectioned by the dash panel and the front side members in the vehicle front space. The high-voltage component is placed ahead of the dash panel in the vehicle front-rear direction and placed above a corresponding one of the front side members.

The impact absorber is provided between the fuel cell unit and the high-voltage component and attached to an inner side surface of the corresponding one of the front side members in the vehicle width direction. In a top view, an outer edge portion of the fuel cell unit in the vehicle width direction is placed inwardly in the vehicle width direction from an inner edge portion of the impact absorber in the vehicle width direction, and an inner edge portion of the high-voltage component in the vehicle width direction is placed outwardly in the vehicle width direction from the inner edge portion of the impact absorber in the vehicle width direction.

With the above configuration, even if the high-voltage component protrudes inwardly in the vehicle width direction from the inner edge portion of the front side member in the vehicle width direction, the impact absorber receives the fuel cell unit at the time when the fuel cell unit moves outwardly in the vehicle width direction. This increases the degree of freedom of arrangement of the high-voltage component in terms of the interference between the fuel cell unit and the high-voltage component.

In the vehicle front structure according to this disclosure, the impact absorber may have a bellows shape obtained by bending a plate material such that valley faces and crest faces are arranged alternately along an extending direction of the impact absorber.

In the vehicle front structure according to this disclosure, $P=(L/n)$ and $N≥(n+1)$ (n is an integer) may be satisfied, where L indicates the length of a projecting portion of the fuel cell unit along the vehicle front-rear direction, the projecting portion being projecting outwardly in the vehicle width direction, the crest faces and the valley faces of the impact absorber have the same length along the extending direction, P indicates a pitch of repetition of (the crest face+the valley face) along the extending direction, and N indicates the total number of crest faces. The impact absorber may be placed on an inner side surface of the corresponding one of the front side members in the vehicle width direction such that the extending direction is along the vehicle front-rear direction and the crest faces face inwardly in the vehicle width direction.

When the relationship between the projecting portion and the impact absorber satisfy $P=(L/n)$ and $N≥(n+1)$ (n is an integer), the length of a crushed part of the crest faces at the time when the projecting portion of the fuel cell unit makes contact with the impact absorber is constant even if the contact position therebetween varies, so that the pressure receiving area to receive the projecting portion becomes constant. For example, at the time of n=1, the total number N of crest faces is set to 2 or more, so as to satisfy L=P. Here, N can be increased depending on variations of the position of the fuel cell unit at the time when the fuel cell unit moves. This attains stable impact absorption regardless of the contact position.

With the vehicle front structure configured as above, it is possible to restrain the interference between the fuel cell unit and the high-voltage component at the time when the vehicle receives an impact load due to a collision or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a view illustrating a state where, subsequently to FIG. 6, the fuel cell unit makes contact with the impact absorber upon receipt of the impact load due to the collision or the like;

DETAILED DESCRIPTION OF EMBODIMENTS

The following describes an embodiment of this disclosure in detail with reference to the drawings. The following deals with a case where one high-voltage component is provided so as to be placed on the right side from a fuel cell unit in a vehicle width direction, but this is an example for descriptions. However, one high-voltage component may be placed on the left side from the fuel cell unit in the vehicle width direction, and in a case where two high-voltage components are used, they may be placed on the right and left sides from the fuel cell unit in the vehicle width direction.

A shape, a material, and the like to be described below are exemplifications for descriptions and can be changed appropriately according to the specification and the like of a vehicle front structure. Further, in the following description, similar elements in all the drawings have the same reference sign and redundant descriptions thereof are omitted.

Figure 1:
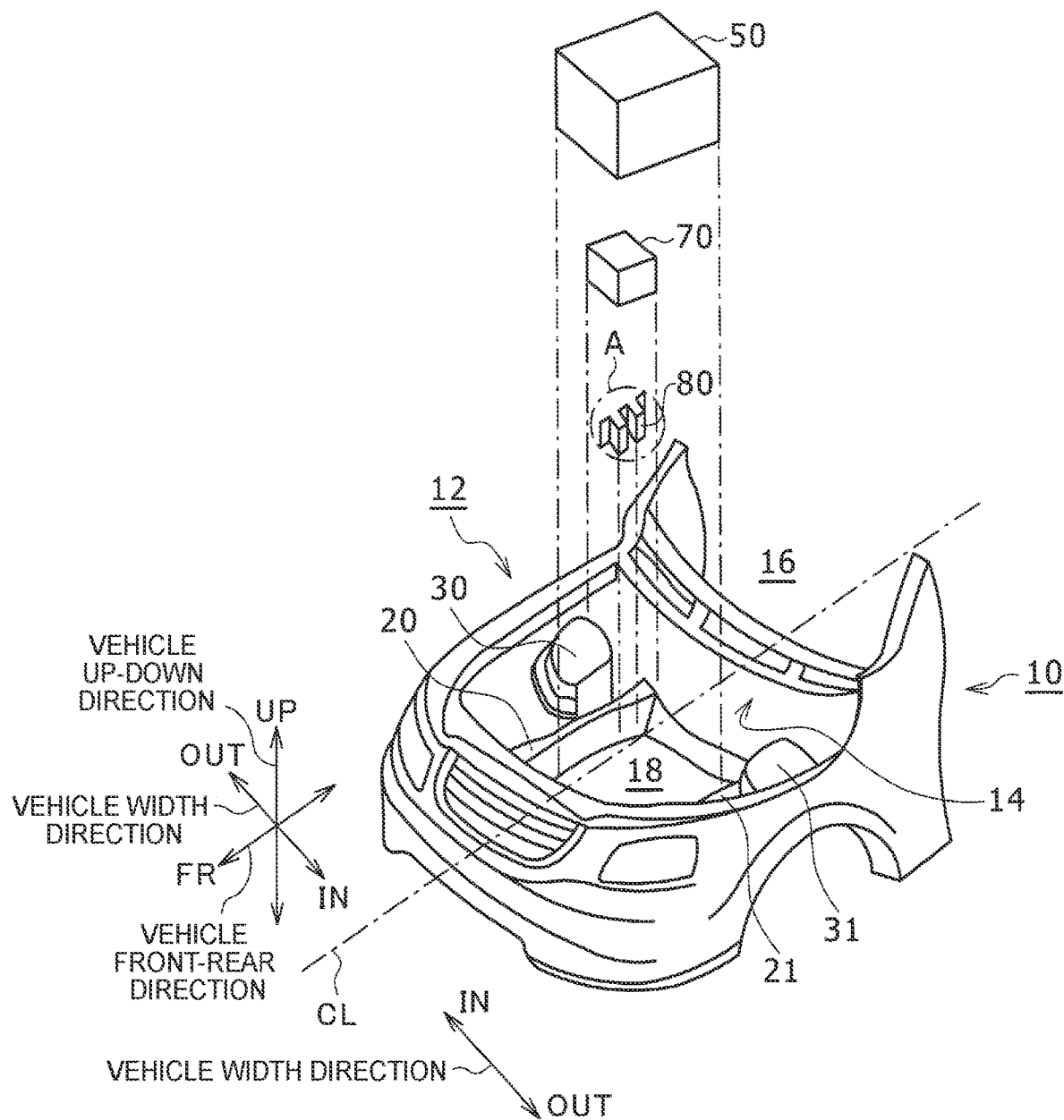
FIG. 1 is a view illustrating a state where a fuel cell unit, a high-voltage component, and an impact absorber are placed in a vehicle front structure according to an embodiment.

FIG. 1 is a perspective view illustrating a vehicle front structure 12 of a fuel cell vehicle 10. In the following description, the fuel cell vehicle 10 is referred to as the vehicle 10 unless otherwise specified. In the following figures, a vehicle width direction, a vehicle front-rear direction, and a vehicle up-down direction are illustrated appropriately. Elements in the vehicle front structure 12 are often placed symmetrically in a width direction of the vehicle 10. In view of this, in terms of the width direction, by use of a central axis CL of the vehicle 10 that is bilaterally symmetrical in the width direction, a vehicle inward direction toward the central axis CL side from the outside of the vehicle is indicated by IN, and a vehicle outward direction toward the outside of the vehicle from the central axis CL side is indicated by OUT. Note that the right and left sides of the vehicle 10 in terms of the vehicle width direction are referred to as the "right side of the vehicle 10" and the "left side of the vehicle 10," respectively. In terms of the vehicle front-rear direction, a direction indicated by FR is a direction toward a vehicle front side, and its opposite direction is a direction toward a vehicle rear side. In terms of the vehicle up-down direction, a direction indicated by UP is a direction toward an upper side from a road surface, and its opposite direction is a direction toward a road surface side.

FIG. 1 illustrates members constituting a body, and an exterior part of a vehicle front portion, the exterior part including a lamp attachment portion and a bumper attachment portion. In FIG. 1, a dash panel 14, front side members 20, 21, and suspension towers 30, 31 are the members constituting the body. The members constituting the body are made of a material having a high strength, such as a high strength steel plate, such that their sectional shapes are formed in a rectangular cylindrical shape. The members are coupled with each other. Here, the term "coupling" indicates that two members are coupled with each other by use of one or more means selected from among laser beam welding, spot welding, and fastening using a bolt and a nut. This also applies to a case where the "coupling" is used hereinafter. As such, the members constituting the body have rigidity effective at the time when the vehicle 10 receives an impact load due to a collision or the like.

In the vehicle front structure 12, the members constituting the body are placed generally symmetrically across the central axis CL. For example, in FIG. 1, the front side members 20, 21 are a pair of members placed on the right side and on the left side across the central axis CL in the vehicle front structure 12, so as to extend in the front-rear direction of the vehicle 10. Further, the suspension towers 30, 31 are members that support front wheels (not shown) of the vehicle 10 and cover suspensions (not shown) each including an absorber for absorbing impact during running, a compression spring, and the like. In view of this, the following mainly deals with the front side member 20 and the suspension tower 30 provided on the right side of the vehicle 10.

Figure 2:
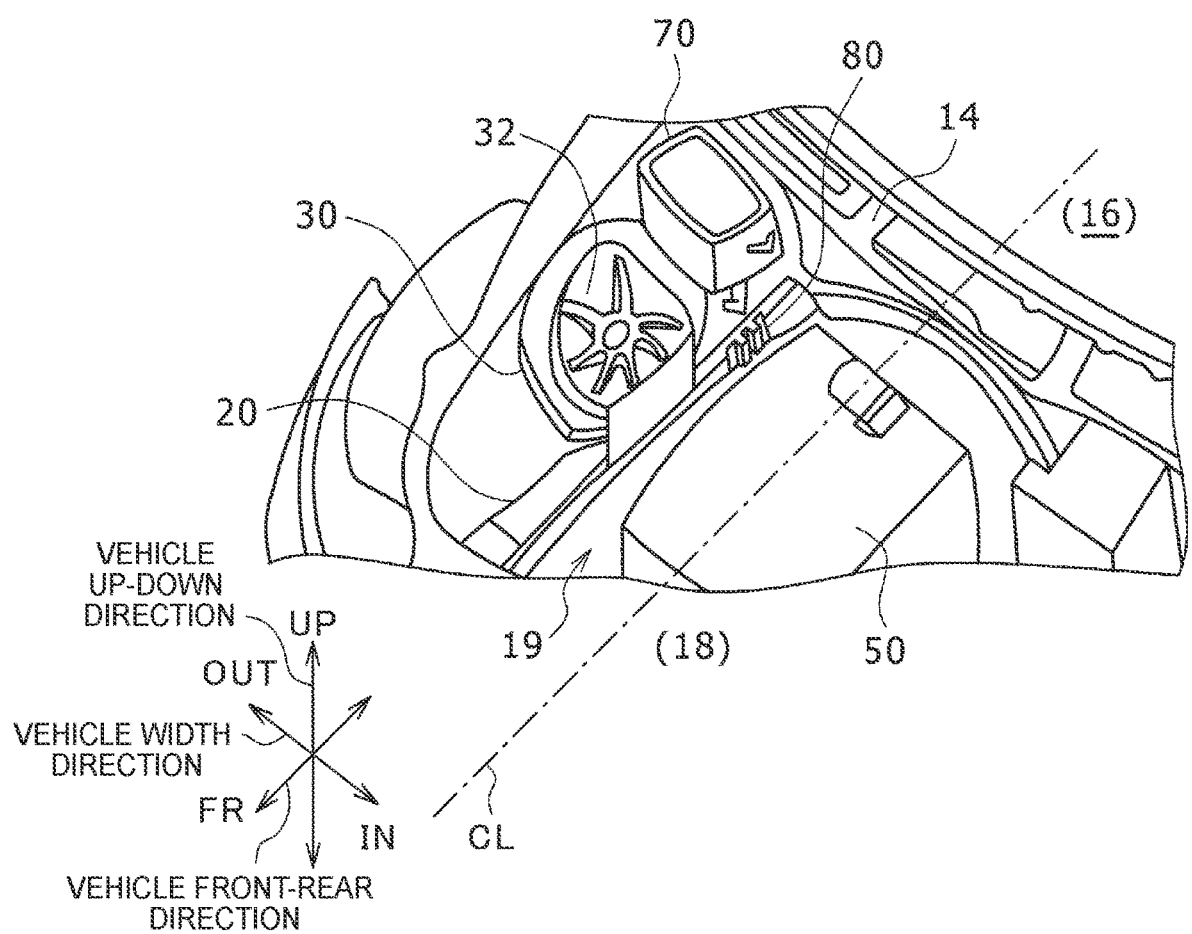
FIG. 2 is an air view of the right side of FIG. 1 in a vehicle width direction.
Figure 3:
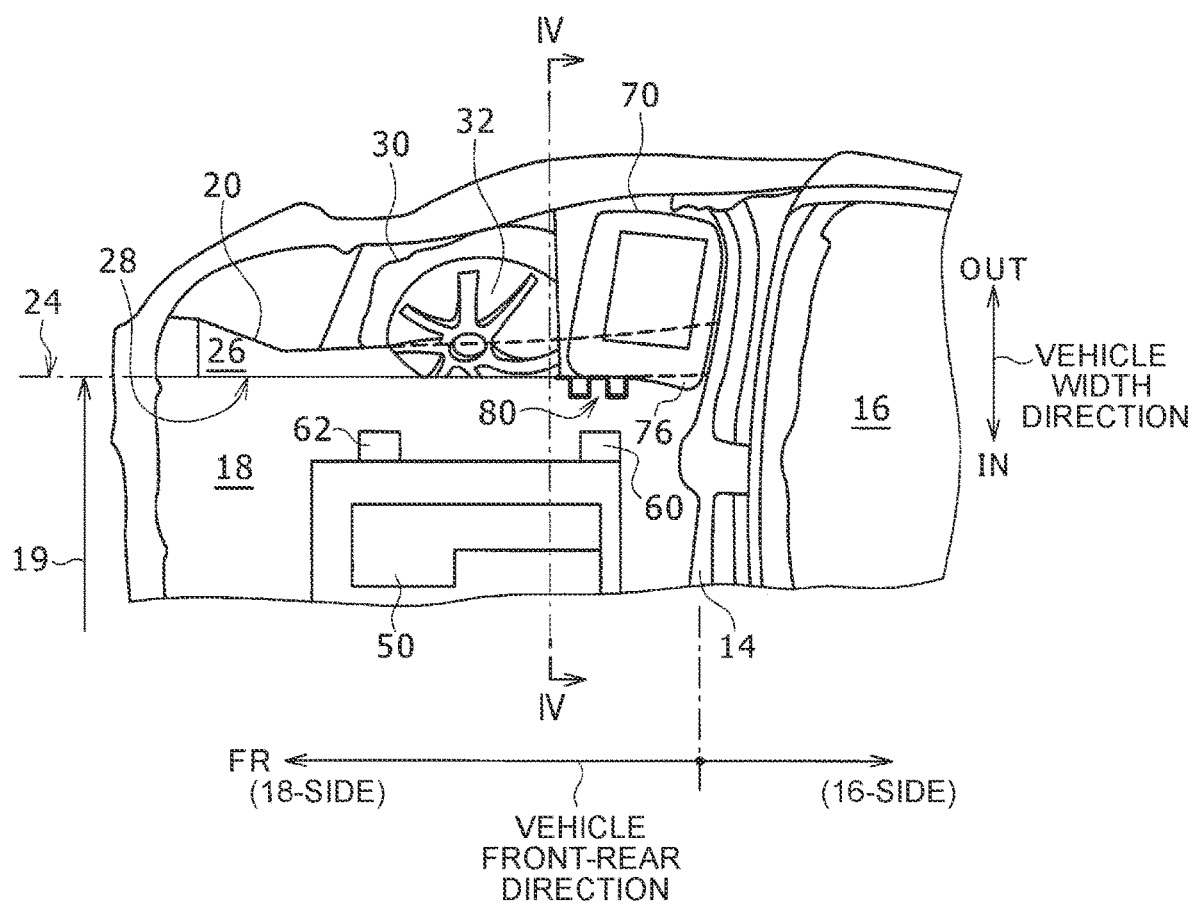
FIG. 3 is a top view of the right side of FIG. 1 in the vehicle width direction.
Figure 4:
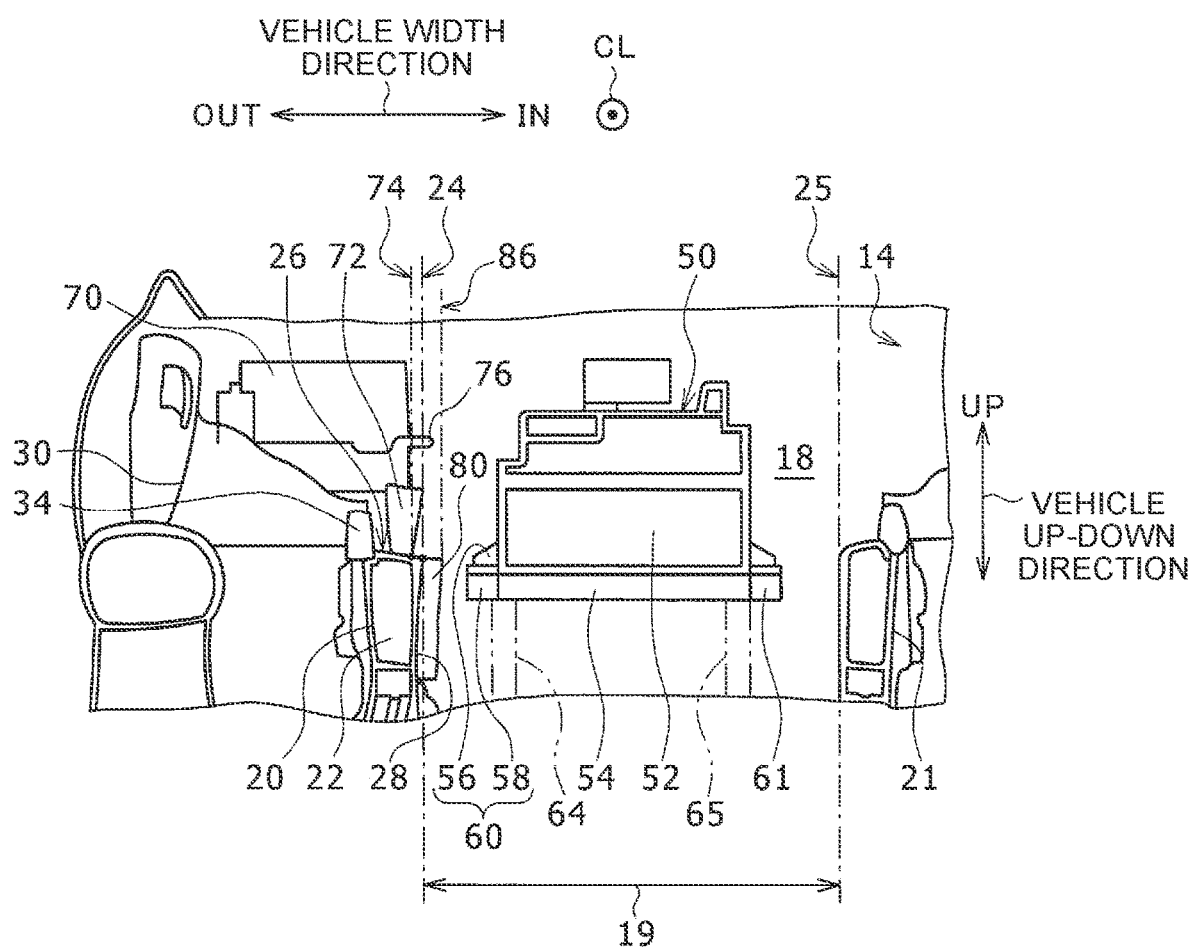
FIG. 4 is a sectional view taken along a line IV-IV in FIG. 3.

FIG. 2 is an air view on the right side of the vehicle 10 in FIG. 1. FIG. 3 is a top view of the right side of the vehicle 10 in FIG. 1. FIG. 4 is a sectional view taken along a line IV-IV in FIG. 3.

The dash panel 14 is a member constituting a lower part of a vehicle front wall of a vehicle cabin and separating a vehicle cabin space 16 from a vehicle front space 18 in the vehicle 10. In a vehicle provided with an engine, the engine is placed in the vehicle front space 18. However, the vehicle 10 is not equipped with an engine, and therefore, a fuel cell unit 50, a high-voltage component 70, and an impact absorber 80 are placed in the vehicle front space 18, as illustrated in FIG. 1.

In the vehicle front structure 12, the front side member 20 is a member placed on the right side from the central axis CL of the bilateral symmetry so as to extend in the front-rear direction of the vehicle 10, and has a tubular shape with a generally rectangular section 22 as illustrated in FIG. 4. In the following description, the front side member 20 is referred to as a side member 20 unless otherwise specified.

The suspension tower 30 is a member configured to support the front wheel of the vehicle 10 and having an upper wall portion 32 covering the suspension (not shown) as illustrated in FIGS. 2, 3. The suspension tower 30 is placed on the FR side from the dash panel 14 and on the UP side from the side member 20, and a lower end 34 of the suspension tower 30 is coupled with a top surface 26 of the side member 20.

The fuel cell unit 50 is a battery configured to obtain electric power by electrochemically reacting reactant gas. For example, the fuel cell unit 50 is obtained such that a laminated body in which a plurality of cells each formed by sandwiching a solid polymer electrolyte membrane between an anode and a cathode is laminated is sandwiched between a pair of end plates and housed in a battery outer case 52. In the vehicle front space 18, the fuel cell unit 50 is placed in a region 19 sectioned by the dash panel 14 and respective IN-side edge portions 24, 25 of the front side members 20, 21 (see FIG. 4).

The battery outer case 52 is coupled with a battery frame base 54 having a sufficient rigidity with respect to an impact load caused due to a collision or the like. In order to couple the battery outer case 52 with the battery frame base 54, case-side mount portions 56 projecting toward the OUT sides are provided at four places on the bottom sides of right and left outer wall portions of the battery outer case 52. Further, base-side mount portions 58 projecting toward the OUT sides are provided at four places in right and left ends of the battery frame base 54 so as to correspond to the case-side mount portions 56. The battery outer case 52 is coupled with the battery frame base 54 such that the case-side mount portion 56 and the base-side mount portion 58 corresponding to each other are aligned and fastened to each other with a bolt and a nut. Four fastening parts are hereby formed so as to project toward the OUT sides from the fuel cell unit 50, so that they are illustrated in FIGS. 3, 4 as projecting portions 60, 61, 62, 63. Note that the projecting portion 63 is not illustrated in FIGS. 3, 4.

The battery frame base 54 is coupled with a sub-frame (not shown) placed in a bottom portion of the vehicle front structure 12 by four fastening leg portions. In FIG. 4, two fastening leg portions 64, 65 among them are indicated by an alternate long and two short dashes line. In a space between the battery frame base 54 and the sub-frame (not shown), fuel cell accessories such as a hydrogen pump (not shown) are placed.

The height positions of the projecting portions 60, 61, 62, 63 along the vehicle up-down direction are set to about the same position as the height position of the side member 20 along the vehicle up-down direction, as illustrated in FIG. 4. Accordingly, when the fuel cell unit 50 moves to the OUT side, the projecting portion 60 is received by the side member 20 having rigidity, thereby making it possible to protect members placed on the OUT side from the side member 20.

The high-voltage component 70 is a power control unit (PCU) configured to accommodate, in a housing thereof, a DC/DC converter configured to convert a direct-current power output from the fuel cell unit 50 into a direct-current power with a predetermined voltage, an inverter configured to perform power conversion between a direct-current power and an alternating-current power, and the like. The housing of the high-voltage component 70 is, for example, a case body made of aluminum alloy and the like. The high-voltage component 70 is connected to the fuel cell unit 50 and an electric apparatus such as a rotary electric machine (not shown) via electrical power cables or the like (not shown).

The high-voltage component 70 is placed ahead of the dash panel 14 but behind the suspension tower 30, and placed above the side member 20. The wording "above the side member 20" indicates the upper side from the side member 20 via an interval as illustrated in FIG. 4, but a bottom portion of the high-voltage component 70 is coupled with the top surface 26 of the side member 20 via a plurality of support members 72. An IN-side edge portion 74 of the high-voltage component 70, including the support members 72, is placed on the OUT side from the IN-side edge portion 24 of the side member 20. Note that, as illustrated in FIG. 4, a bracket 76 is provided so as to overhang from an outer wall surface of the high-voltage component 70, but the position of the bracket 76 in the vehicle up-down direction is much higher than a part where the support members 72 are coupled with the side member 20, and is distant from an OUT-side edge of the fuel cell unit 50.

The fuel cell unit 50 is placed on the IN side from the side member 20, and the high-voltage component 70 is placed on the OUT side from the IN-side edge portion 24 of the side member 20. In the arrangement relationship, when the vehicle 10 receives an impact load due to a collision or the like and the fuel cell unit 50 moves to the OUT side, for example, the projecting portion 60 makes contact with the IN-side edge portion 24 of the side member 20 first. Even at this time, interference between the high-voltage component 70 and the fuel cell unit 50 is restrained due to the rigidity of the side member 20.

Further, since the high-voltage component 70 is placed ahead of the dash panel 14 but behind the suspension tower 30, the high-voltage component 70 can be protected from impact even when the vehicle 10 receives an impact load due to a collision or the like. For example, since the high-voltage component 70 is surrounded by the side member 20, the dash panel 14, and the suspension tower 30, even if the fuel cell unit 50 moves to the OUT side, the interference between the fuel cell unit 50 and the high-voltage component 70 can be restrained by the rigidity of the side member 20, the dash panel 14, and the suspension tower 30.

Figure 5:
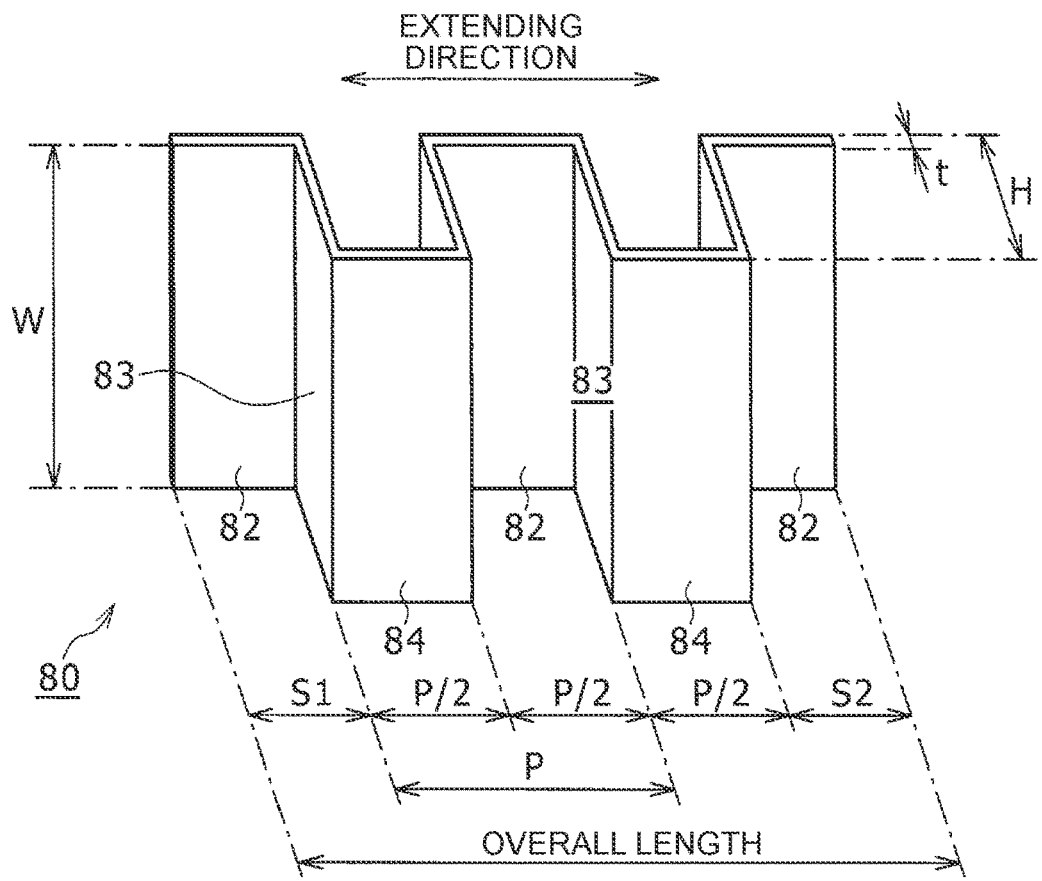
FIG. 5 is an enlarged perspective view of the impact absorber in a part A illustrated in FIG. 1.

Next will be described the impact absorber 80 illustrated in a part A in FIG. 1. The impact absorber 80 is a spacer placed between the fuel cell unit 50 and the high-voltage component 70 and functioning to absorb energy of an impact load at the time when the vehicle 10 receives the impact load due to a collision or the like. When the vehicle 10 receives the impact load due to the collision or the like and the fuel cell unit 50 moves to the OUT side, the fuel cell unit 50 approaches the high-voltage component 70. In view of this, the impact absorber 80 is attached to an IN-side side surface 28 of the side member 20 so as to absorb a striking energy before the fuel cell unit 50 makes contact with the high-voltage component 70. FIG. 5 is a perspective view of the impact absorber 80.

The impact absorber 80 is a member formed such that a plate material having a plate thickness t and a width dimension W is bent sequentially in a direction perpendicular to an extending direction thereof so as to form valley faces 82, vertical wall portions 83, and crest faces 84 in a bellows shape. The bellows shape is a shape in which projections and recesses are repeated along its extending direction. However, for the purpose of impact absorption, the projections and recesses should not have a sharp point like a triangle. In some embodiments, the projections and recesses have a flat surface having an area to some extent so that a contact pressure to be received is stabilized. In view of this, a section of the bellows shape of the impact absorber 80 is a "hat" shape like the section of a derby hat. Note that, since the IN-side side surface 28 of the side member 20 is a surface having projections and recesses to some extent, the impact absorber 80 having the bellows shape also has an advantage that the impact absorber 80 is easily attachable.

The valley faces 82 and the crest faces 84 are surfaces parallel in the extending direction, but the total number of either the valley faces 82 or the crest faces 84 is larger than the other by one. The number of valley faces 82 is larger than the number of crest faces 84, and the valley faces 82 serve as attachment surfaces to be attached to the side member 20. The number of crest faces 84 is less than that of the valley faces 82 by one, and the crest faces 84 serve as pressure receiving surfaces that receive an impact load. In the bellows shape, the pitch P of repetition of the crest face 84 and the valley face 82 is equal to {(the length of the valley face 82 along the extending direction)+(the length of the crest face 84 along the extending direction)}. In the following description, the pitch P is indicated by "the pitch P=(the crest face+the valley face)" unless otherwise specified.

The valley face 82 is an attachment surface attached to the IN-side side surface 28 of the side member 20. The attachment does not need to be as strong as the "coupling" and can be achieved by use of adhesive, for example. Spot welding may be used in some cases.

The crest face 84 is a surface projecting from the valley face 82 by a predetermined height H. The crest face 84 is a pressure receiving surface to be crushed by receiving a striking energy that is a kinetic energy of the fuel cell unit 50 at the time when the fuel cell unit 50 moves to the OUT side and makes contact therewith. The crest face 84 hereby absorbs the kinetic energy of the fuel cell unit 50.

The area of the valley face 82 relates to attachment stability, and the area of the crest face 84 relates to a size of the pressure receiving area that receives an impact. The area of the valley face 82 and the area of the crest face 84 may be different, but herein, the area of the valley face 82 and the area of the crest face 84 are set to the same area, so as to establish (the length of the valley face 82 along the extending direction)=(the length of the crest face 84 along the extending direction)=(P/2). When the width dimension of the impact absorber 80 is W, the pressure receiving area of one crest face 84 is {W×(P/2)}. Here, W may be set to the same dimension as the IN-side side surface 28 of the side member 20 in the vehicle up-down direction.

The vertical wall portion 83 is a wall surface standing from the valley face 82 toward the crest face 84 and is a part that deforms in the case of impact absorption. As the height H of the vertical wall portion 83 is higher, the absorption time at the time of absorbing an impact becomes longer and the absorption amount of energy also becomes larger.

The crest faces 84 and the valley face 82 adjacently provided between the crest faces 84 contribute to the impact absorption. The valley faces 82 provided in the opposite ends that are further outside the outermost crest faces 84 along the extending direction mainly function as attachment surfaces. Accordingly, the lengths S1, S2 of the valley faces 82 in the opposite ends along the extending direction may be determined roughly.

The pitch P and the number of crest faces 84 will be described later in connection with the dimension of the projecting portion 60 that is a part to make contact with the impact absorber 80 first at the time when the fuel cell unit 50 moves to the OUT side.

As the impact absorber 80, an impact absorber obtained by shaping a material suitable for impact absorption into a shape as exemplified in FIG. 5 can be used. As the material, a metallic material having a suitable elasticity without being crushed into pieces upon receipt of an impact load and configured to absorb a striking energy by deformation is used. As the metallic material, it is possible to use soft-iron, for example. A plastic material having a suitable toughness may be used in some cases. One plate material may be shaped, a laminated plate may be shaped, or a plurality of shaped plates may be laminated. An example of the dimension is given as follows. That is, in a case of using soft-iron as the material, the plate thickness t is from about 1 mm to a few mm, (P/2) is around several dozens mm, H is around several dozens mm, and further, W is from around 100 mm to around 300 mm depending on the dimension of the side member 20. The values mentioned herein are exemplifications for descriptions, and can be changed appropriately depending on the specification of the vehicle 10 for impact safety and the like, the mass of the fuel cell unit 50, and the like.

The impact absorber 80 is attached to the IN-side side surface 28 of the front side member 20 with such a posture that the extending direction thereof where the valley faces 82 and the crest faces 84 are arranged is along the vehicle front-rear direction, the width direction thereof is along the vehicle up-down direction, and the height direction thereof where the crest faces 84 project is directed toward the IN side. Hereby, an IN-side edge portion 86 indicative of the position of the crest faces 84 of the impact absorber 80 along the vehicle width direction is placed on the IN side from the IN-side edge portion 24 of the side member 20 only by H. When the fuel cell unit 50 moves to the OUT side upon receipt of an impact load due to a collision or the like, the projecting portion 60 placed on the most OUT side in the fuel cell unit 50 makes contact with the IN-side edge portion 86 of the impact absorber 80 earlier than the projecting portion 60 makes contact with the IN-side edge portion 24 of the side member 20.

In other words, when the impact absorber 80 having the height H is provided on the side surface 28 of the IN-side edge portion 24 of the side member 20, the projecting portion 60 that is an outer edge portion of the fuel cell unit 50 in the vehicle width direction is placed on the IN side from the IN-side edge portion 86 of the impact absorber 80. The IN-side edge portion 74 of the high-voltage component 70 should be placed on the OUT side from the IN-side edge portion 86 of the impact absorber 80. A dimension difference between the IN-side edge portion 86 of the impact absorber 80 and the IN-side edge portion 24 of the side member 20 along the vehicle width direction is equal to the height H of the impact absorber 80. With the use of the impact absorber 80, a margin is formed at the arrangement position of the high-voltage component 70 along the vehicle width direction just by the height H. Even in a case where the high-voltage component 70 protrudes to the IN side from the IN-side edge portion 24 of the side member 20, if the high-voltage component 70 protrudes within the height H, the impact absorber 80 receives the projecting portion 60 of the fuel cell unit 50 at the time when the fuel cell unit 50 moves to the OUT side. This makes it possible to achieve further improvement in terms of the interference between the fuel cell unit 50 and the high-voltage component 70.

The effect of the vehicle front structure 12 configured as above will be described further in details with reference to FIGS. 6 to 9. FIGS. 6 to 9 are views illustrating the interference between the projecting portion 60 of the fuel cell unit 50 and the high-voltage component 70, with the use of a modeled view obtained by modelling the top view of FIG. 1.

Figure 6:
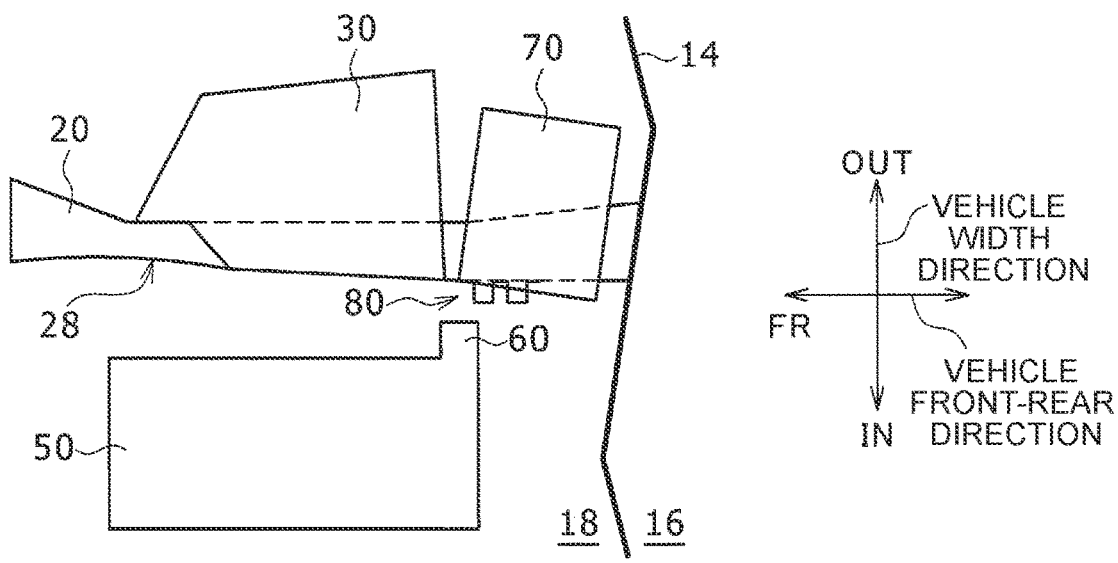
FIG. 6 is a view illustrating an initial state before an impact load due to a collision or the like is received, by use of a modeling view of FIG. 4, in terms of an effect of the vehicle front structure according to the embodiment.
Figure 7:
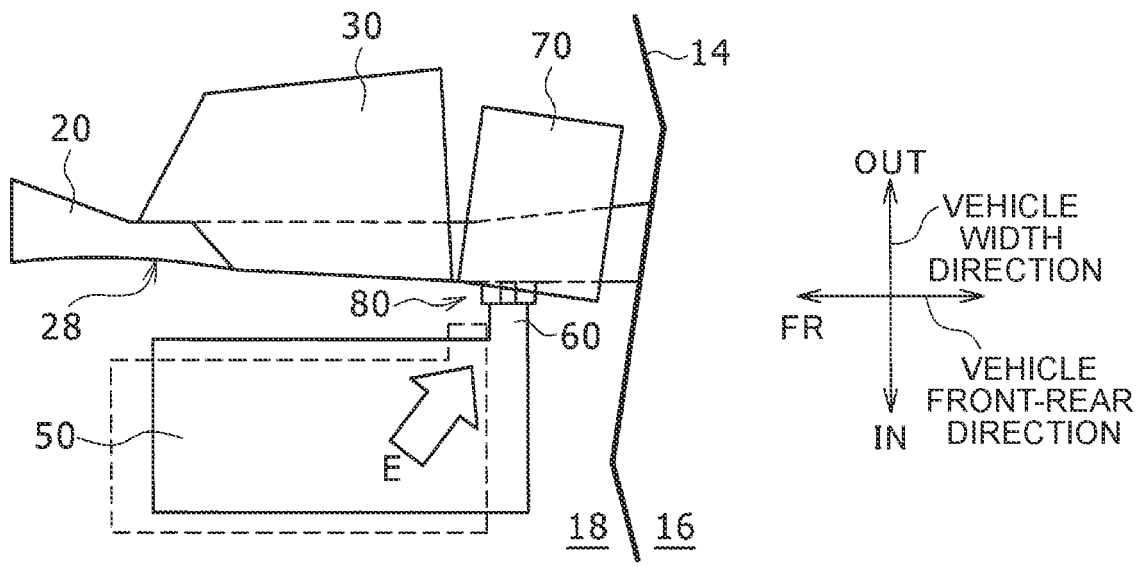

FIG. 6 is a view illustrating an initial state before the receipt of an impact load due to a collision or the like. The projecting portion 60 of the fuel cell unit 50 is distanced from the impact absorber 80. FIG. 7 is a view illustrating a state where, subsequently to FIG. 6, the fuel cell unit 50 receives the impact load and obtains a kinetic energy E so as to move to the OUT side, so that the projecting portion 60 makes contact with the impact absorber 80.

Figure 8:
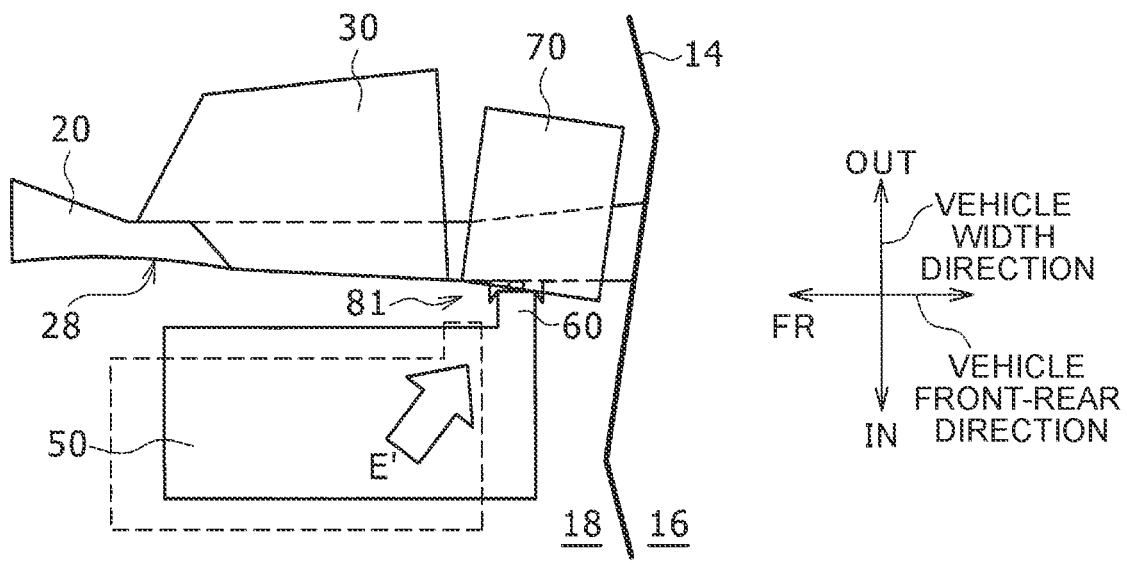
FIG. 8 is a view illustrating a state where, subsequently to FIG. 7, the fuel cell unit deforms the impact absorber so that a kinetic energy caused by impact is absorbed.

FIG. 8 is a view illustrating a state where, subsequently to FIG. 7, the fuel cell unit 50 having the kinetic energy E further moves to the OUT side so as to partially crush the crest faces 84 of the impact absorber 80. The kinetic energy E is partially converted into a deformation energy of the impact absorber 80 and heat and then absorbed, so that the fuel cell unit 50 has a kinetic energy E' decreased by the absorbed amount.

Figure 9:
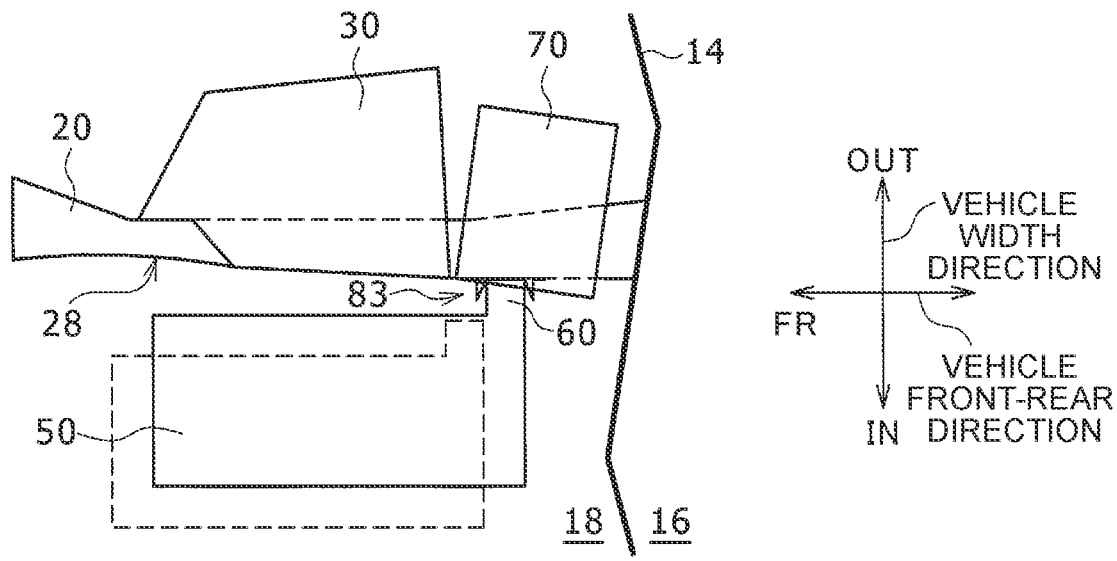
FIG. 9 is a view illustrating a state where, subsequently to FIG. 8, the fuel cell unit having a decreased kinetic energy makes contact with the high-voltage component.

FIG. 9 is a view illustrating a state where, subsequently to FIG. 8, the fuel cell unit 50 having the kinetic energy E' thus decreased further moves to the OUT side and completely crushes the crest faces 84 of the impact absorber 80, so as to make contact with the IN-side side surface 28 of the side member 20 via around the plate thickness t of the impact absorber 80. The kinetic energy E' is partially converted into a deformation energy of the impact absorber 80 and heat, and the rest of the kinetic energy E' is received by the rigidity of the side member 20 so as to be absorbed. Hereby, the fuel cell unit 50 loses the kinetic energy and is stopped.

As such, the fuel cell unit 50 only gives, to the side member 20, an impact that is further smaller than the kinetic energy E', so that an impact to the high-voltage component 70 placed on the OUT side from the IN-side edge portion 24 of the side member 20 is small. Further, even in a case where the IN-side edge portion 74 of the high-voltage component 70 protrudes to the IN side, if the IN-side edge portion 74 is placed on the OUT side from the edges of the crest faces 84 of the impact absorber 80, an impact absorption action of the impact absorber 80 works, so that the impact received by the high-voltage component 70 is decreased. Accordingly, when the impact absorber 80 is provided, the kinetic energy of the fuel cell unit 50 can be absorbed before the fuel cell unit 50 directly makes contact with the high-voltage component 70, thereby making it possible to reduce an impact caused due to the interference between the fuel cell unit 50 and the high-voltage component 70.

Next will be described a relationship between the dimension of the impact absorber 80 and the dimension of the projecting portion 60 with reference to FIGS. 10 to 13. FIGS. 10 to 13 are views using a view in which a part related to the dimension of the impact absorber 80 and the projecting portion 60 in FIG. 6 is extracted and modelled, so as to illustrate respective states where the projecting portion 60 makes contact with the impact absorber 80 at different positions in the vehicle front-rear direction when the fuel cell unit 50 moves to the OUT side. The following describes a condition that achieves the same pressure receiving area even if the position where the projecting portion 60 makes contact with the impact absorber 80 varies, while the total number N of crest faces 84 in the impact absorber 80 is set to N=2 that is minimum as the bellows shape and the dimension of the projecting portion 60 along the vehicle front-rear direction is assumed L.

Figure 10:
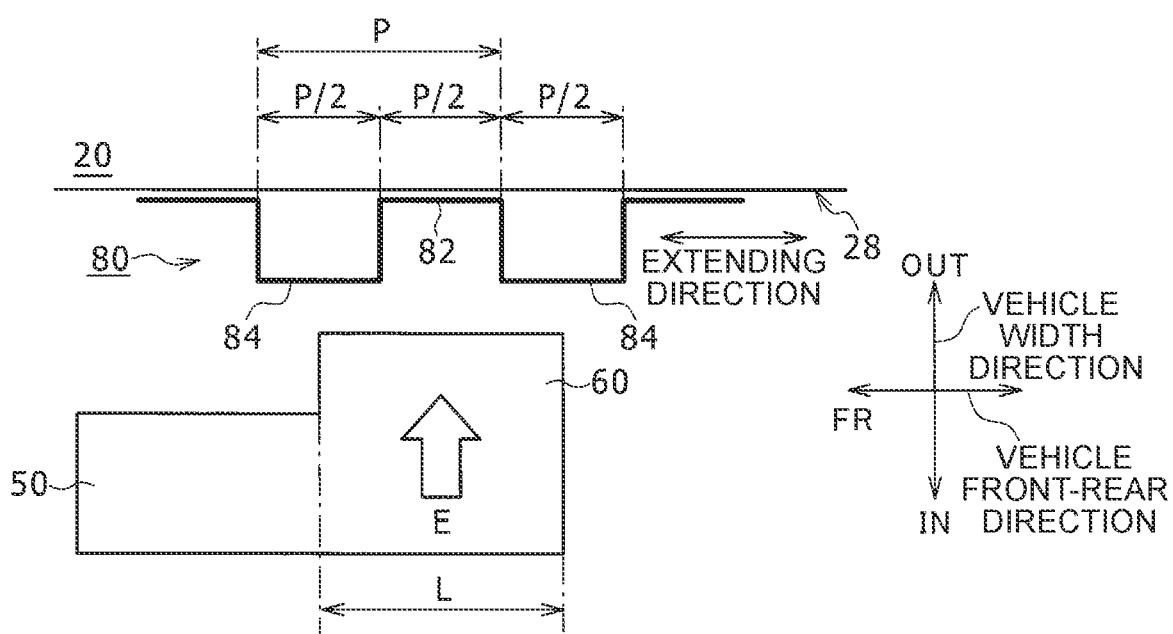
FIG. 10 is a view illustrating a relationship of the length L of a projecting portion of the fuel cell unit with respect to the length (P/2) of crest faces and valley faces of the impact absorber and the total number N of the crest faces, in the vehicle front structure according to the embodiment.

FIG. 10 corresponds to a state of FIG. 6, and illustrates a state where the fuel cell unit 50 moves to the OUT side, but does not make contact with the impact absorber 80 yet. The impact absorber 80 is placed on the IN-side side surface 28 of the side member 20 with its extending direction being along the vehicle front-rear direction and the crest faces 84 facing the IN side. Here, the fuel cell unit 50 receives an impact load due to a collision or the like and moves to the OUT side with the kinetic energy E toward the impact absorber 80.

Figure 11:
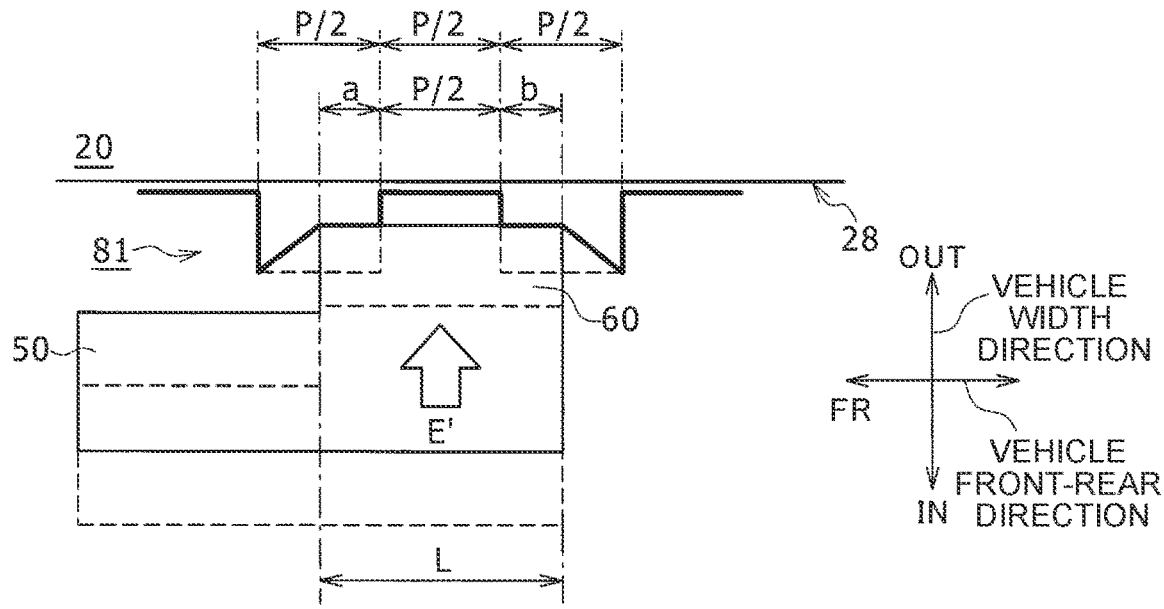
FIG. 11 is a view illustrating a state where the projecting portion of the fuel cell unit makes contact with two crest faces in the dimension relationship of FIG. 10.

FIG. 11 corresponds to a state of FIG. 8 and illustrates a state where the projecting portion 60 of the fuel cell unit 50 has crushed a part of the impact absorber 80. Herein, the projecting portion 60 makes contact with two crest faces 84, so that the impact absorber 80 deforms to an impact absorber 81 in which the two crest faces 84 are partially crushed. The length of a part of the crest face 84 on the FR side, the part receiving the projecting portion 60, is assumed a, and the length of a part of the other crest face 84, the part receiving the projecting portion 60, is assumed b. Here, a, b are lengths measured along the extending direction. Accordingly, the impact absorber 80 receives the projecting portion 60 with a pressure receiving area obtained by multiplying (a+b) by the width dimension W. When the impact absorber 80 deforms to the impact absorber 81, the kinetic energy of the fuel cell unit 50 is decreased from E to E'. That is, the impact absorber 80 receives the projecting portion 60 with the pressure receiving area=W×(a+b) and absorbs a kinetic energy of ΔE=E−E'.

Figure 12:
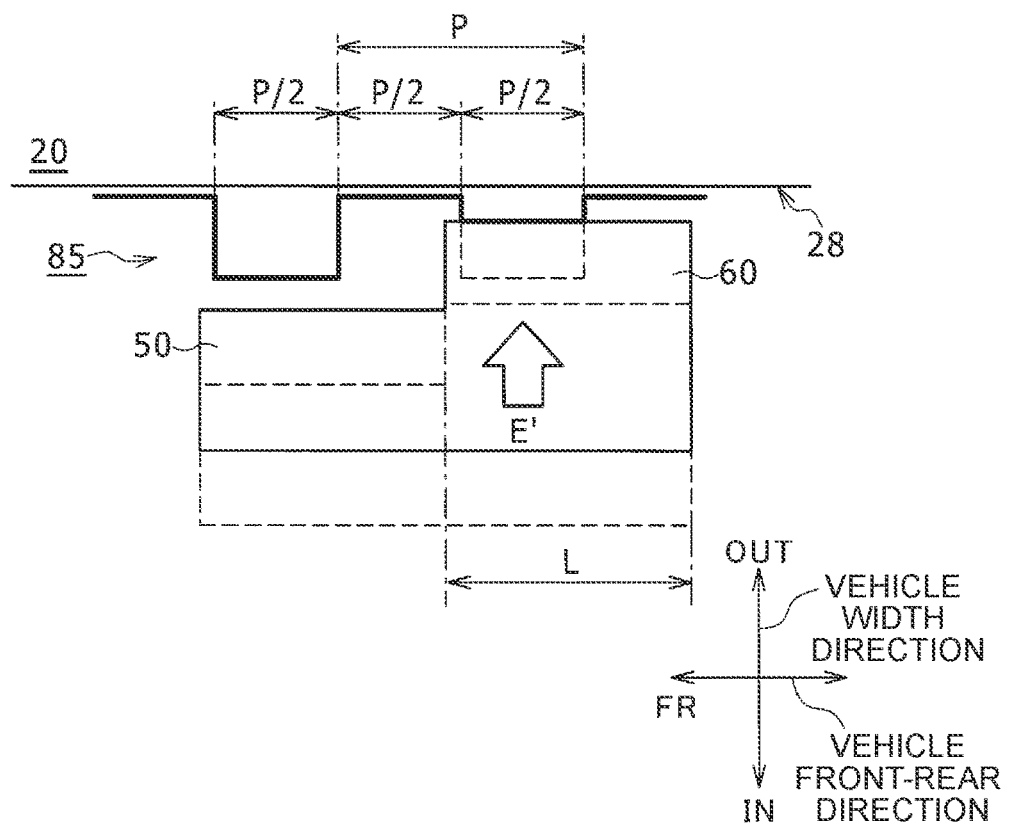
FIG. 12 is a view illustrating a state where the projecting portion of the fuel cell unit makes contact with only one of the two crest faces in the dimension relationship of FIG. 10.
Figure 13:
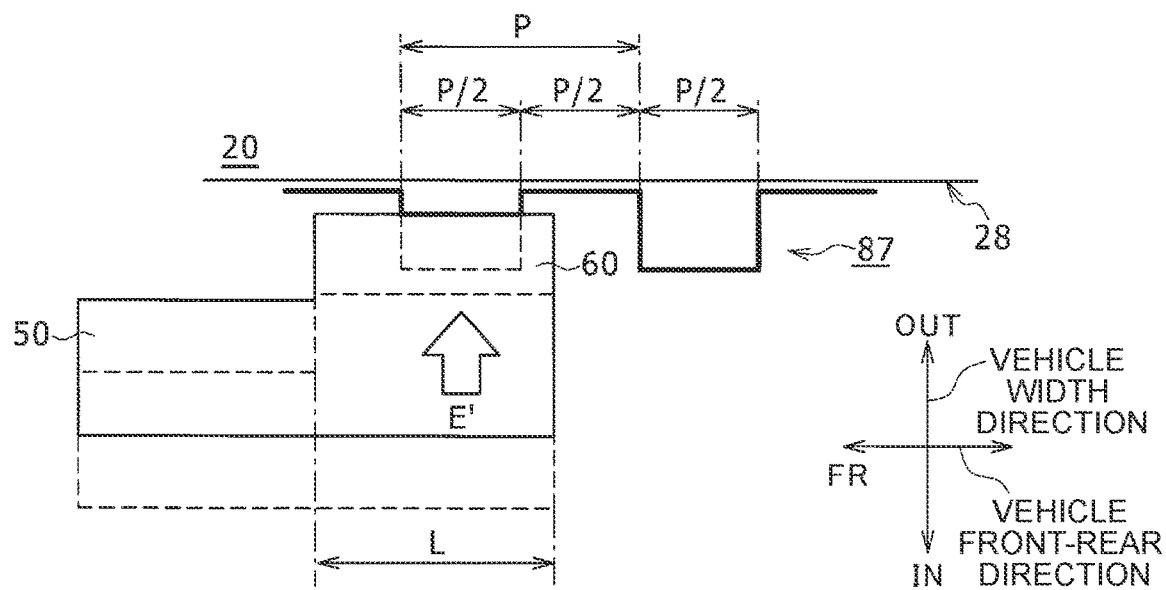
FIG. 13 is a view illustrating a state where the projecting portion of the fuel cell unit makes contact with only the other one of the two crest faces in the dimension relationship of FIG. 10.

Differently from FIG. 11, FIGS. 12 and 13 are views each illustrating a state where the contact position between the projecting portion 60 of the fuel cell unit 50 and the impact absorber 80 deviates from the state in FIG. 11, so that only one of the crest faces 84 is crushed. In FIG. 12, the moving position of the fuel cell unit 50 to the OUT side deviates rearward in the vehicle front-rear direction from the state in FIG. 11, so that the impact absorber 80 deforms to an impact absorber 85 in which the crest face 84 on the rear side in the vehicle front-rear direction is partially crushed. In FIG. 13, the moving position of the fuel cell unit 50 to the OUT side deviates to the FR side from the state in FIG. 11, so that the impact absorber 80 deforms to an impact absorber 87 in which the crest face 84 on the FR side is partially crushed. As illustrated in FIGS. 12, 13, in either case, the impact absorber 80 receives the projecting portion 60 only by one crest face 84, and accordingly, the pressure receiving area is W×(P/2) obtained by multiplying the length (P/2) of the crest face 84 along the extending direction by the width dimension W.

In order to achieve the same pressure receiving area in any case of FIGS. 11, 12, 13, the pressure receiving area=W×(a+b) in FIG. 11 should be set to the same as the pressure receiving area=W×(P/2) in FIGS. 12, 13. Accordingly, in a case where (a+b)=(P/2) is satisfied, even if the contact position between the projecting portion 60 and the impact absorber 80 varies, the same pressure receiving area is obtained, thereby making it possible to decrease the kinetic energy of the fuel cell unit 50 from E to E'.

As illustrated in FIG. 11, the length L of the projecting portion 60 is {a+(P/2)+b}, and therefore, when the condition of (a+b)=(P/2) is applied, L=P is established. That is, when the length of the crest face 84 along the extending direction of the impact absorber 80 is set to (P/2) that is the same as the length of the valley face 82, and the pitch of repetition of (the crest face 84+the valley face 82) along the extending direction is assumed P, P should be set to the same as the length L of the projecting portion 60 along the vehicle front-rear direction. That is, in a case where L=P is established, even if the projecting portion 60 makes contact with any part of the impact absorber 80, the pressure receiving area of the impact absorber 80 that receives the projecting portion 60 can be made the same. Hereby, even when the behavior of the fuel cell unit 50 varies at the time when the vehicle 10 receives an impact load due to a collision or the like, it is possible to improve robustness in impact absorption amount, so that a stable impact absorption effect is obtained.

Figure 14:
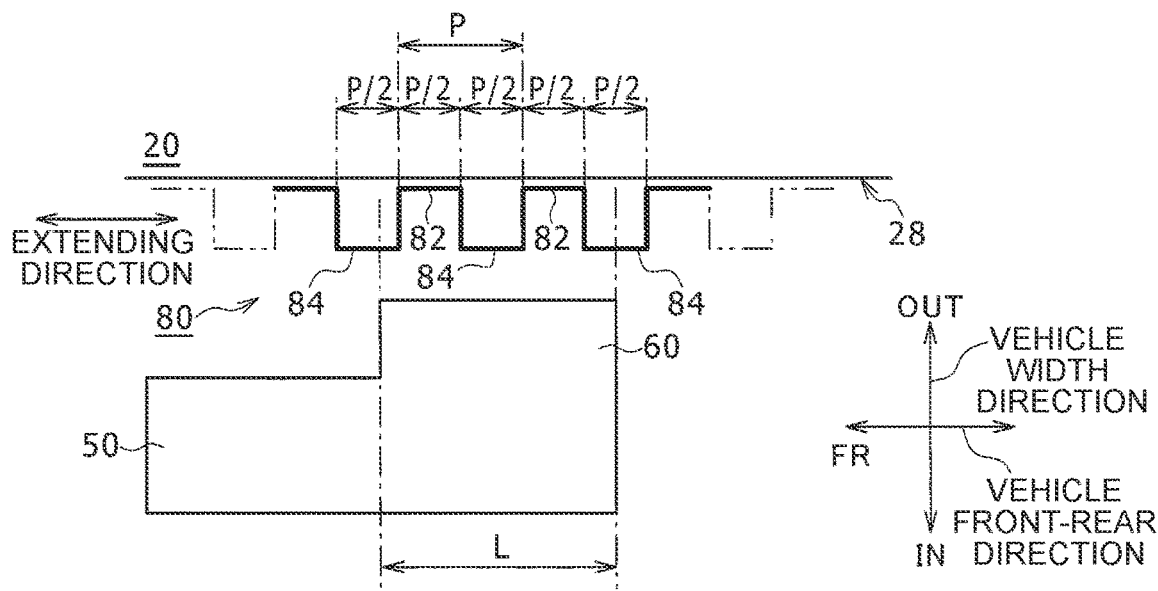
FIG. 14 is a view illustrating an example in which the total number N of the crest faces is three in FIG. 10.

In FIGS. 10 to 13, the projecting portion 60 is received by two crest faces 84 at the maximum, but the projecting portion 60 may be received by three crest faces 84 at the maximum. FIG. 14 is a view corresponding to FIG. 10, and illustrates an example in which the total number N of crest faces 84 in the impact absorber 80 is three and the projecting portion 60 is received by three crest faces 84 at the maximum. Referring to FIGS. 14, 10, and further in consideration of FIGS. 11 to 13, when the length L of the projecting portion 60 satisfies L=2P, the same pressure receiving area of the impact absorber 80 that receives the projecting portion 60 is achieved even if the contact position between the projecting portion 60 and the impact absorber 80 varies.

The above description deals with the example in which L=P is established when the total number N of crest faces 84 in the impact absorber 80 is two, and the example in which L=2P is established when the total number N of crest faces 84 of the impact absorber 80 is three. The above description is generalized as follows. That is, when n is an integer, L=nP is established, and the total number N of crest faces 84 satisfies N=(n+1), the same pressure receiving area of the impact absorber 80 that receives the projecting portion 60 can be obtained even if the contact position between the projecting portion 60 and the impact absorber 80 varies.

Note that, as indicated by an alternate long and two short dashes line in FIG. 14, the number of crest faces 84 and the number of valley faces 82 may be increased so as to increase the overall length of the impact absorber 80 along the extending direction, as long as the condition of L=2P is satisfied. When this is generalized, the total number N of crest faces 84 should be N≥(n+1).

Accordingly, the impact absorber 80 may be configured such that the length of the crest face 84 along the extending direction is set to the same as the length of the valley face 82, and P=(L/n) and N≥(n+1) are satisfied, where P indicates the pitch of repetition of (the crest face 84+the valley face 82) along the extending direction and N indicates the total number of crest faces 84. Accordingly, the moving range of the fuel cell unit 50 along the vehicle front-rear direction is widely covered at the time when the vehicle 10 receives an impact load and the fuel cell unit 50 moves to the OUT side, and the pressure receiving area of the impact absorber 80 that receives the projecting portion 60 can be made constant, thereby making it possible to obtain a stable impact absorption effect.

The vehicle front structure 12 configured as above includes the front side members 20, 21 respectively placed on the right side and on the left side in the vehicle width direction in the vehicle front space 18 ahead of the vehicle cabin space 16 in the vehicle 10, so as to extend in the vehicle front-rear direction. Further, the vehicle front structure 12 includes the fuel cell unit 50 placed in the region 19 sectioned by the front side members 20, 21 in the vehicle front space 18. Furthermore, the vehicle front structure 12 includes the high-voltage component 70 placed above the front side member 20. In a top view, an inner edge portion of the high-voltage component 70 in the vehicle width direction is placed outwardly in the vehicle width direction from an inner edge portion of the front side member 20 in the vehicle width direction.

The front side members 20, 21 in the vehicle front structure 12 are members constituting a body and have rigidity effective at the time when the vehicle 10 receives an impact load due to a collision or the like. In the above configuration, the fuel cell unit 50 is placed inwardly in the vehicle width direction from the front side members 20, 21, and the high-voltage component 70 is placed outwardly in the vehicle width direction from the inner edge portion of the front side member 20 in the vehicle width direction. Hereby, even if the fuel cell unit 50 moves outwardly in the vehicle width direction at the time when the vehicle 10 receives the impact load due to the collision or the like, the interference between the high-voltage component 70 and the fuel cell unit 50 is restrained due to the rigidity of the front side member 20.

What is claimed is:

1. A vehicle front structure comprising:
a pair of front side members, the front side members being respectively placed on a right side and on a left side in a vehicle width direction in a vehicle front space ahead of a vehicle cabin space in a vehicle, so as to extend in a vehicle front-rear direction;
a fuel cell unit placed in a region sectioned by the front side members in the vehicle front space; and
a high-voltage component placed above a corresponding one of the front side members, wherein in a top view, an inner edge portion of the high-voltage component in the vehicle width direction is placed outwardly in the vehicle width direction from an inner edge portion of the corresponding one of the front side members in the vehicle width direction.

2. The vehicle front structure according to claim 1, further comprising:
a dash panel separating the vehicle cabin space from the vehicle front space in the vehicle; and
a suspension tower coupled with the corresponding one of the front side members in the vehicle front space, the suspension tower extending upward in a vehicle up-down direction, wherein:
the fuel cell unit is placed in a region sectioned by the dash panel and the front side members in the vehicle front space; and
the high-voltage component is placed above the corresponding one of the front side members in a region between the dash panel and the suspension tower.

3. The vehicle front structure according to claim 1, further comprising an impact absorber provided between the fuel cell unit and the high-voltage component, the impact absorber being attached to an inner side surface of the corresponding one of the front side members in the vehicle width direction.

4. The vehicle front structure according to claim 3, wherein the impact absorber has a bellows shape obtained by bending a plate material such that valley faces and crest faces are arranged alternately along an extending direction of the impact absorber.

5. A vehicle front structure comprising:
a dash panel separating a vehicle cabin space from a vehicle front space in a vehicle;
a pair of front side members, the front side members being respectively placed on a right side and on a left side in a vehicle width direction in the vehicle front space, so as to extend in a vehicle front-rear direction;
a fuel cell unit placed in a region sectioned by the dash panel and the front side members in the vehicle front space;
a high-voltage component placed ahead of the dash panel in the vehicle front-rear direction and placed above a corresponding one of the front side members; and
an impact absorber provided between the fuel cell unit and the high-voltage component, the impact absorber being attached to an inner side surface of the corresponding one of the front side members in the vehicle width direction, wherein:
in a top view, an outer edge portion of the fuel cell unit in the vehicle width direction is placed inwardly in the vehicle width direction from an inner edge portion of the impact absorber in the vehicle width direction; and
an inner edge portion of the high-voltage component in the vehicle width direction is placed outwardly in the vehicle width direction from the inner edge portion of the impact absorber in the vehicle width direction.

6. The vehicle front structure according to claim 5, wherein the impact absorber has a bellows shape obtained by bending a plate material such that valley faces and crest faces are arranged alternately along an extending direction of the impact absorber.

7. The vehicle front structure according to claim 6, wherein:
$P=(L/n)$ and $N \geq (n+1)$ (n is an integer) are satisfied, where
L indicates a length of a projecting portion of the fuel cell unit along the vehicle front-rear direction, the projecting portion being projecting outwardly in the vehicle width direction,
the crest faces and the valley faces of the impact absorber have the same length along the extending direction,
P indicates a pitch of repetition of (the crest face+the valley face) along the extending direction, and
N indicates the total number of crest faces; and
the impact absorber is placed on an inner side surface of the corresponding one of the front side members in the vehicle width direction such that the extending direction is along the vehicle front-rear direction and the crest faces face inwardly in the vehicle width direction.

* * * * *